(12) United States Patent
Bhattacharryya et al.

(10) Patent No.: US 7,700,240 B2
(45) Date of Patent: Apr. 20, 2010

(54) NON-AQUEOUS ELECTROLYTE FOR USE IN A BATTERY

(75) Inventors: Aninda Bhattacharryya, Stuttgart (DE); Joachim Maier, Wiernsheim (DE)

(73) Assignee: Max-Planck-Gesellschaft zur Forderung der Wissenschaften e.V., Munich (DE)

(*) Notice: Subject to any disclaimer, the term of this patent is extended or adjusted under 35 U.S.C. 154(b) by 0 days.

(21) Appl. No.: 10/913,959

(22) Filed: Aug. 6, 2004

(65) Prior Publication Data

US 2005/0042522 A1 Feb. 24, 2005

(30) Foreign Application Priority Data

Aug. 8, 2003 (EP) ................... 03018161

(51) Int. Cl.
*H01M 2/02* (2006.01)
(52) U.S. Cl. ..................... 429/306; 429/326
(58) Field of Classification Search ........... 429/231.95, 429/309, 310, 314, 316, 317, 188, 306, 320, 429/324, 326, 327, 303, 331, 330
See application file for complete search history.

(56) References Cited

U.S. PATENT DOCUMENTS

| | | | |
|---|---|---|---|
| 3,625,769 A | 12/1971 | Lyall | |
| 4,228,229 A | 10/1980 | Gabano et al. | |
| 5,168,019 A | 12/1992 | Sugeno | |
| 6,045,594 A | 4/2000 | Yanai et al. | |
| 6,828,065 B2 * | 12/2004 | Munshi | 429/309 |
| 2006/0035148 A1 | 2/2006 | Balaya et al. | |

FOREIGN PATENT DOCUMENTS

| | | |
|---|---|---|
| DE | 102 42 694 A1 | 3/2004 |
| EP | 0 805 504 A1 | 11/1997 |
| EP | 0 895 296 A1 | 2/1999 |
| EP | 1 505 680 B1 | 12/2008 |
| JP | 8-255615 A | 10/1996 |
| JP | 10-116603 A | 5/1998 |
| JP | 10-334730 A | 12/1998 |
| JP | 11-317242 A | 11/1999 |

(Continued)

OTHER PUBLICATIONS

A.S. Best et al., "An investigation of the electrode-electrolyte interface of lithium-ion batteries based on nano-composite electrlytes", Proc. Of 14th International Conference on Solid State Ionics, Monterey California, pp. 312-313, Jun. 2003.*

(Continued)

*Primary Examiner*—Patrick Ryan
*Assistant Examiner*—Monique Wills
(74) *Attorney, Agent, or Firm*—Lewis and Roca LLP (57) ABSTRACT

A non-aqueous electrolyte is disclosed. Exemplary embodiments include at least one ionically conducting salt, especially a lithium salt, a non-aqueous, anhydrous solvent for the ionically conductive salt, the solvent being selected to achieve a degree of dissociation of the ionically conductive salt in the non-aqueous solvent, at least one oxide in a particulate form, the oxide being selected such that it is not soluble in the solvent and such that it is water-free. The electrolyte can be used in a primary or secondary lithium battery, in a supercapacitor, in an electro-chromic display or in a solar cell.

21 Claims, 4 Drawing Sheets

FOREIGN PATENT DOCUMENTS

| | | |
|---|---|---|
| JP | 2001-167794 A | 6/2001 |
| JP | 2002008730 A | 1/2002 |
| JP | 2003-317695 A | 11/2003 |

OTHER PUBLICATIONS

Amita Chandra et al., "Properties and morphology of highly conducting inorganic solid-liquid composites based on AgCl", *Solid State Ionics 148*, pp. 153-158, Feb. 2002.

W. Wieczorek et al., "Composite polyether based solid electrolytes", *Electrochimica Acta*, vol. 40, No. 13-14, pp. 2251-2258, Apr. 1995.

Fiona Gray et al., "Polymer Electrolytes", *Handbook of Battery Materials*, pp. 499-523, 1999.

F. Croce et al., "Nanocomposite polymer electrolytes for lithium batteries", *Nature*, vol. 394, pp. 456-458, Jul. 1998.

Joachim Maier, "Ionic Conduction in space charge regions", *Prog, Solid St. Chem.*, vol. 23, pp. 171-263, 1995.

James S. Reed, "Principles of ceramic processing", *A Wiley-Interscience Publication*, pp. 152-153, 1995.

Arthur W. Adamson, "Physical Chemistry of Surfaces", *A Wiley-Interscience Publication*, pp. 184-191, 1982.

A.S. Best et al., "An investigation of the electrode-electrolyte interface of lithium-ion batteries based on nano-composite electrolytes", *Proc. Of 14th International Conference on Solid State Ionics*, Monterey, California, pp. 312-313, Jun. 2003.

Communication, European Search Report, and Annex of the European Search Report on European Patent Application No. EP 04 01 8470.7 filed Nov. 11, 2004 based on priority No. EP 03018161 filed Aug. 8, 2003 entitled "Non-aqueous Electrolyte and a Battery, a Supercapacitor, an Electrochromic Device and a Solar Cell Including such a Electrolyte," Applicant Max-Planck-Gesellschaft zur Forderung.

Hong Li et al., "Studies of Capacity Loss Capacity Fading of Nanosized SnSb Alloy Anode for Li-Ion Batteries", Journal of The Electrochemical Society, Jul. 5, 2001; vol. 148, No. 8, pp. A915-A922.

\* cited by examiner

NON-AQUEOUS ELECTROLYTE FOR USE IN A BATTERY

PRIORITY CLAIM

This application claims filing date priority benefit to European Patent Application No. 03 018 161.4 filed Aug. 8, 2003, which is explicitly incorporated by reference as if set forth below.

FIELD OF THE DISCLOSURE

The present invention relates to a non-aqueous electrolyte and has particular reference to a non-aqueous electrolyte which can be used in a primary or secondary battery, such as a lithium battery, in a supercapacitor, in an electrochromic device or in a solar energy cell. Furthermore, the present invention relates to a non-aqueous electrolyte when used in any of the foregoing devices.

THE PRIOR ART

Background

Lithium batteries are known in non-rechargeable and in rechargeable form. Such batteries comprise positive and negative electrodes with a non-aqueous electrolyte disposed between them.

In a rechargeable lithium ion battery (secondary battery) the positive electrode of the battery can for example be $LiCoO_2$ (referred to as the "cathode" in Li-battery community) and the negative electrode can for example be carbon (referred to as the "anode" in Li-battery community). In a non-rechargeable battery (primary battery) the positive electrode can for example be $MnO_2$ and the negative electrode can be lithium metal. Various different types of electrolyte are known. For example there is the class of liquid electrolytes comprising at least one ionically conducting salt such as Li(TFSI), i.e. lithium bis(trifluorosulphonyl)imide, $LiPF_6$, i.e. lithium hexafluorophosphate or $LiClO_4$, i.e. lithium perchlorate which are present, with a low degree of dissociation within a non-aqueous solvent such as a mixture of DME (dimethylethane) and EC (ethylene carbonate), a mixture of DEC (diethylene carbonate) and EC, or a mixture of DMC (dimethyl carbonate) and EC or PC (propylene carbonate) or combinations thereof.

In addition there are so-called dry polymer electrolytes. In these electrolytes the salt is selected as before (i.e. for example from Li(TFSI), $LiPF_6$ or $LiClO_4$) and is dispersed in a polymer or mixture of polymers. Suitable polymers comprise PEO (polyethylene oxide), PVDF (polyvinylene difluoride), PAN (polyacrylonitrile), and PMMA (polymethyl methyl acrylate).

Furthermore, there are so called polymer gel electrolytes. These have the same basic composition as the dry polymer electrolytes recited above but include a solvent, for example a solvent of the kind recited in connection with the liquid electrolytes given above.

The known liquid electrolytes described have the advantage that they have a high ionic conductivity up to a transference number of 6 and a high conductivity of $10^{-2}$ S/cm. In addition the liquid properties ensure good wetting of the electrode surface. They are however dangerous because leakage can occur, so that safety considerations arise. In addition they can lead to passivation effects which are undesirable.

The dry polymer electrolytes do not result in good wetting of the electrodes, the conductivities which can be achieved are quite low and there is also not much scope for modifying the chemical composition of the ingredients. However, the electrolytes are good safety-wise and no leakage occurs.

With the polymer gel electrolytes the change in liquid content results in reductions in the conductivity and there is also the danger of leakage.

SUMMARY

The object of the present invention is to provide an electrolyte comprising a lithium salt and a solvent as before but with an improved conductivity.

In order to satisfy this object there is provided, in accordance with the present invention, a non-aqueous electrolyte including a. at least one ionically conducting salt, especially a lithium salt, b. a non-aqueous, anhydrous solvent for the ionically conductive salt, said solvent being selected to achieve a degree of dissociation of the ionically conductive salt in the non-aqueous solvent, c. at least one oxide in a particulate form, said oxide being selected such that it is not soluble in said solvent and such that it is water-free.

The applicants have namely found that the addition of fine oxide particles, e.g. in powder or elongate particle form, leads to a substantial increase in conductivity but with no disadvantages.

The electrolyte preferably has a low degree of dissociation, preferably with association constant in the range from $1 \times 10^{-1}$ to $10^8/l^{-1}.mol^{-1}$.

When used in a primary or secondary lithium battery having positive and negative electrodes, the oxide should be selected such that it does not react with the material of either of said positive and negative electrodes.

The non-aqueous electrolyte of the present invention is not restricted to use in a battery, it can for example be used in a supercapacitor, in electrochromic devices such as electrochromic displays or in a solar energy cell.

In the non-aqueous electrolyte of the invention the ionically conductive salt is selected from the group comprising Li(TFSI), $LiPF_6$ and $LiClO_4$.

Moreover, the non-aqueous, anhydrous solvent is preferably selected from the group comprising DEC/EC, DMC/EC, PC, carbonate based solvents related to any of the foregoing, Dimethyl Sulfoxide (DMSO), organic sulphur compounds, THF, Acryl Nitrile AN), and mixtures of any of the foregoing.

The oxide used for the invention is preferably selected from the group comprising oxides exhibiting acidic properties, for example $SiO_2$, $TiO_2$ and oxides exhibiting basic properties, for example $Al_2O_3$, MgO and any mixtures thereof.

The average particle size of the oxide for particles of approximately spherical shape, is selected to be less than 5 μm and preferably less than 2 μm, with no lower limit other than that set by manufacturing techniques used to produce said oxide. For elongate particles, such as nano-wires or nano-tubes, the average diameter is selected to be less than 1 μm, preferably less than 100 nm, there being no limit on the length of such elongate particles.

The amount of oxide present in the electrolyte is preferably such as to give the electrolyte a consistency between that of a liquid and a solid, preferably a consistency similar to that of a soggy sand, i.e. a liquid and sand mixture having a consistency such that sedimentation effects do not occur.

DETAILED DESCRIPTION

Figure 1:
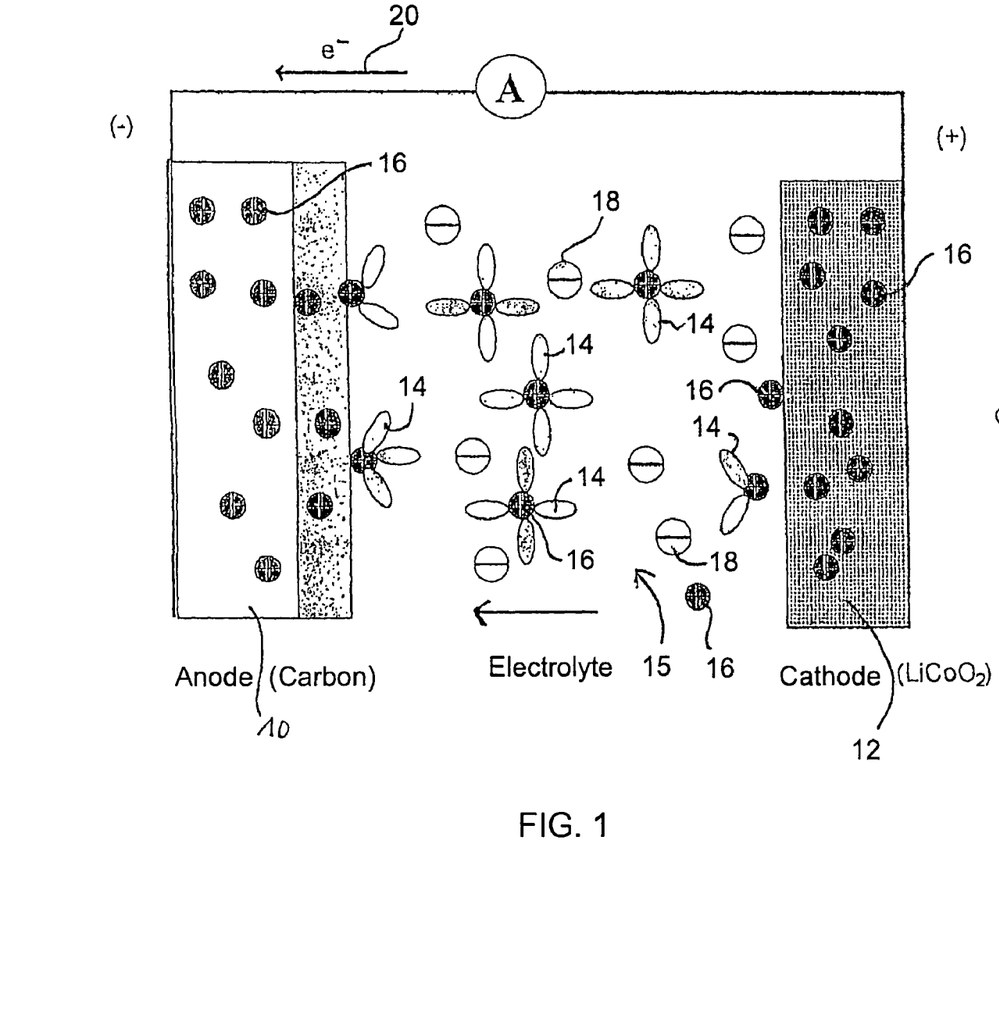
FIG. 1 shows a schematic illustration of a conventional lithium-ion battery.

Referring first to FIG. 1 there is shown a diagram showing the basic configuration of an Li-ion battery of a kind used for research. It typically comprises an anode (in this case a carbon anode) 10, a cathode 12, in this case $LiCoO_2$ and an electrolyte 14 disposed in the space between the anode 10 and the cathode 12. Present throughout the volume of the electrolyte 15 are also lithium ions 16 shown as circles with a cross in the middle, and anions 18 shown as larger circles with a single line through the middle. When an external circuit is connected to the battery, current flows in the direction opposite to the arrow 20 during discharging and in the direction of the arrow during charging.

As is appreciated by those of ordinary skill in the art, transition metal oxides, more specifically the oxides Fe, Ni, Co, Cu, show promising performance as anode materials for rechargeable lithium batteries. The reversible Li-storage mechanism is due to the formation and decomposition of $Li_2O$ upon the electrochemical insertion/extraction of Li. The key point for the reversibility seems to be the formation of a special microstructure in which metal clusters are dispersed uniformly with $Li_2O$ at a nanoscale after electrochemical reaction of metal oxide with Li.

German patent application 102 42 694.5 assigned to the present applicants recognizes that LiF, which is electrochemically inactive, shows electrochemical activity when it is dispersed with a transition metal at atomic or nanoscale level. A series of transition metal fluorides (M=Ti, V, Mn, Fe, Co, Ni, Cu) were investigated and led to favorable results.

The experimental setup was as follows:

The working electrodes comprised either TiF3A: $TiF_3$: PVDF (9:1) on Ti foil; or TiF3B: $TiF_3$: CB: GP: PVDF (10: 0.5:0.5:1) on Ti foil. CB denotes carbon black, GP denotes graphite and PVDF denotes polyvinylene di-fluoride. The pasting procedures for the electrode film on the Ti-foil are similar to those reported in H. Li. L. H. Shi, W. Lu, X. J. Huang, L. Q. Chen, J. Electrochem. Soc., 148, A915(2001)

The electrochemical cells tested were 2-electrode cells for electrochemical testing similar in layout to the known cell of FIG. 1 but using the alternative electrodes. It is noted that the electrode materials proposed and claimed in the German patent application 102 42 694.5 can be used as either anodes or cathodes depending on the relative potential difference to the metal lithium. If this potential difference is 2.5 volts or less then the material is considered suitable as an anode material. If the potential difference is 2.5 volts or more then the material is considered suitable as a cathode material.

Figure 2:
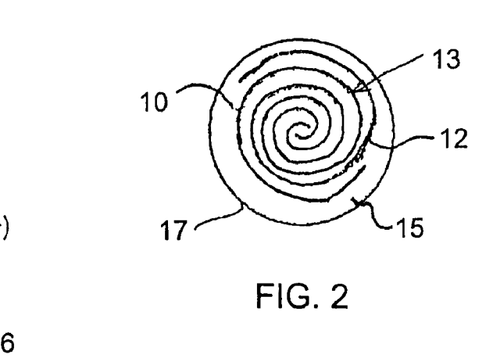
FIG. 2 shows a schematic illustration of an alternative design of a lithium-ion battery.

FIG. 2 shows an alternative layout for a battery where the electrodes 10 and 12 are coiled in a spiral 13 with the electrolyte 15 disposed between them and the structure being encapsulated in a housing 17. Terminals connected to the anode 10 and the cathode 12 are provided at opposite ends of the housing (terminals not shown) in a manner known in the art. The same layout as shown in and described with reference to FIG. 2 can be used for a supercapacitor.

The materials can be the same as those described with reference to FIG. 1.

Two examples will now be given for the preparation of non-aqueous, anhydrous electrolytes:

EXAMPLE 1

The composite electrolyte was prepared in the form of a mixture of fine particles of ceramic oxides ($SiO_2$, $TiO_2$ and $Al_2O_3$, radius: r~0.15 μm) with a non-aqueous solution of 0.1M $LiClO_4$ in Methanol (MeOH). Although MeOH was selected for this test it is not a preferred solvent for lithium batteries. However, because the invention is effective using MeOH it is contemplated that it will work better in the preferred solvents, i.e. in a non-aqueous, anhydrous solvent selected from the group comprising DME/EC, DEC/EC, DMC/EC, PC, carbonate based solvents related to any of the foregoing, DMSO, organic sulphur compounds, THF, AN and mixtures of any of the foregoing, and indeed practical tests have confirmed this.

In this example the oxides were dried in vacuum at 250° C. for 24 hours prior to composite preparation and all samples were prepared under an Argon atmosphere in a glove box (closed container with a window and gloves for handling the materials involved). Room temperature conductivity was measured for various volume fractions using impedance spectroscopy with the samples placed between two parallel stainless steel electrodes of a home-built cell (samples loaded under Argon). The impurity effects were excluded by pre-washing the oxides in the liquid solvents. The conductivity was better than $2 \times 10^{-3}$ S/cm.

Figure 3:
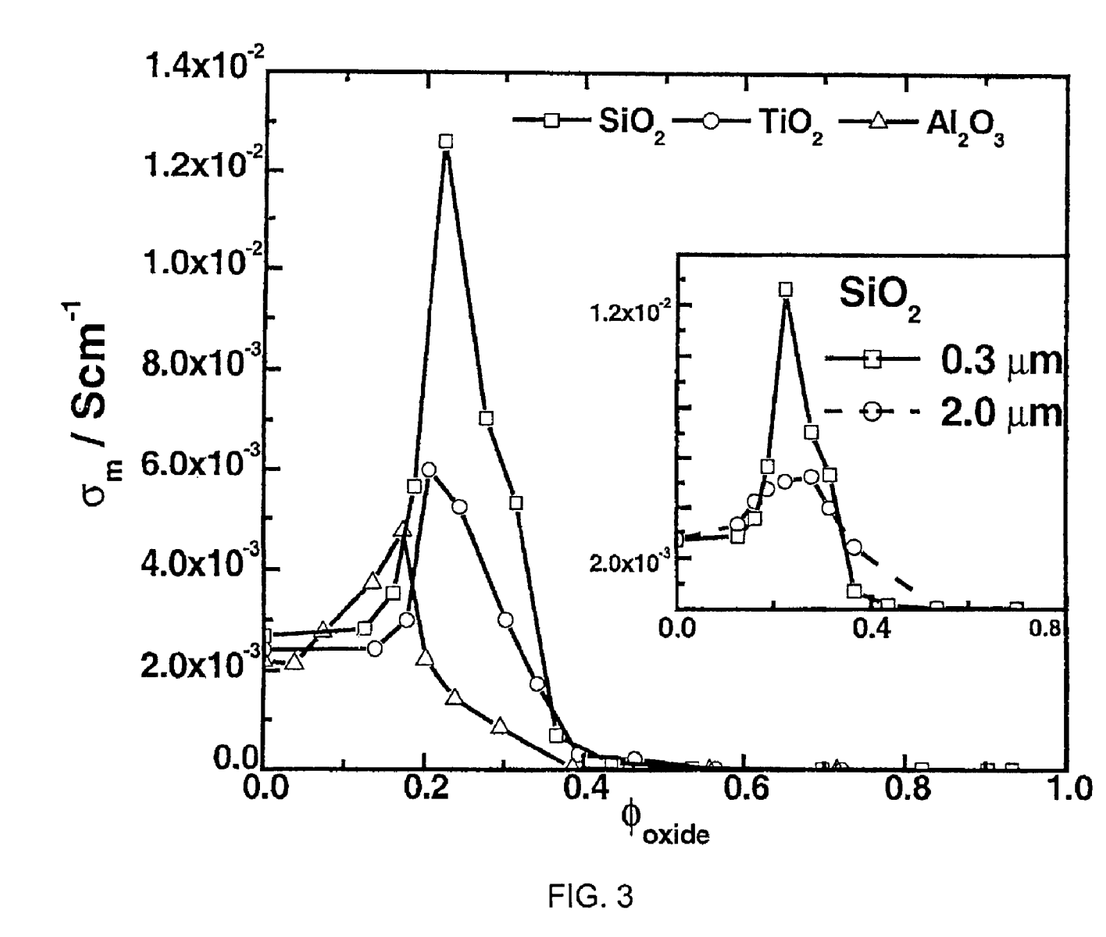
FIG. 3 shows a plot of composite conductivity versus various oxide volume fractions (particle size (=2r) approx 0.3 μm) at room temperature illustrating how oxide surface acidity/basicity influences the composite conductivity, with the insert showing the influence of particle size on composite conductivity.

FIG. 3 shows the variation of the effective overall ionic conductivity with volume fraction ($\phi$) for different oxides. As observed for all the oxides, the composite conductivity with oxide volume fraction shows a percolation-type behaviour that is typical for a composite electrolyte with enhanced interfacial conductivity, i.e. low conductivity at low oxide content, a pronounced increase with a marked maximum and subsequent decrease at higher volume fractions. Since in the inorganic solid-solid composite electrolytes the pathways are ordered ($Al_2O_3$ particles along the grain boundaries), the percolation threshold is normally shifted to lower volume fractions. Composite conductivity is, as FIG. 3 shows, highly influenced by the differing surface acid-base property of the oxides; the conductivity enhancement is higher for the acidic oxides $SiO_2$, $TiO_2$ (highest for $SiO_2$) compared to the more basic $Al_2O_3$ (pH of point of zero charge (pzc) in aqueous solutions being: 3, 5 and 9 for $SiO_2$, $TiO_2$ and $Al_2O_3$ respectively.

This is interpreted as suggesting that the conductivity enhancement in the liquid-solid composite is attributable to the formation of a highly conducting layer around the oxide filler with a higher Li ion conductivity compared to that in the solution caused by adsorption of the anion and breaking up of the ion-pair. This is also supported by ζ-potential measurements ($\phi_{oxide} \approx 5 \times 10^{-5}$, $[LiClO4] \approx 10^{-3}$M) arising out of the effective surface charge showing a more negative potential measuring from $Al_2O_3$ (−18.3 mV) to $SiO_2$ (−36.3 mV). In the regime of lower oxide fractions, i.e. in the colloidal regime, the double layer repulsion works against percolation and leads to the very poor effect in the case of $SiO_2$. The earlier but smoother increase (lower percolation threshold) in that regime of the $Al_2O_3$ composite is in agreement with a lower charge density at the $Al_2O_3$ surface. As soon as the particles are forced to be sufficiently close (Debye length, $\lambda$~100 nm) the interfacial conductivity percolates (in a cubic arrangement the minimal particle-particle distance ($\delta$) is assessed to be $2\delta \approx 2r$ at $\phi \approx 6.5\%$). At this volume fraction range the situation resembles the Nafion-type electrolytes in which the counter ion is attached to the polymer backbone and the proton is mobile within tiny water filled channels. Since the freed counter ion needs solvent to be mobile the conductivity breaks down at higher $\phi$, (in cubic arrangement $\delta$~0 for $\phi$~52%). The maximum conductivity enhancement was observed for $SiO_2$-composite with $\sigma_m = 1.2 \times 10^{-2}$ S/cm which is of the order of a high conducting electrolyte used for Li-battery. The interfacial picture is also supported by the fact that the $SiO_2$ with larger surface area per unit volume, i.e. with an average particle size of 0.3 μm, (inset FIG. 3) is distinctly more active than with an average particle size of 2.0 μm.

EXAMPLE 2

Figure 4:
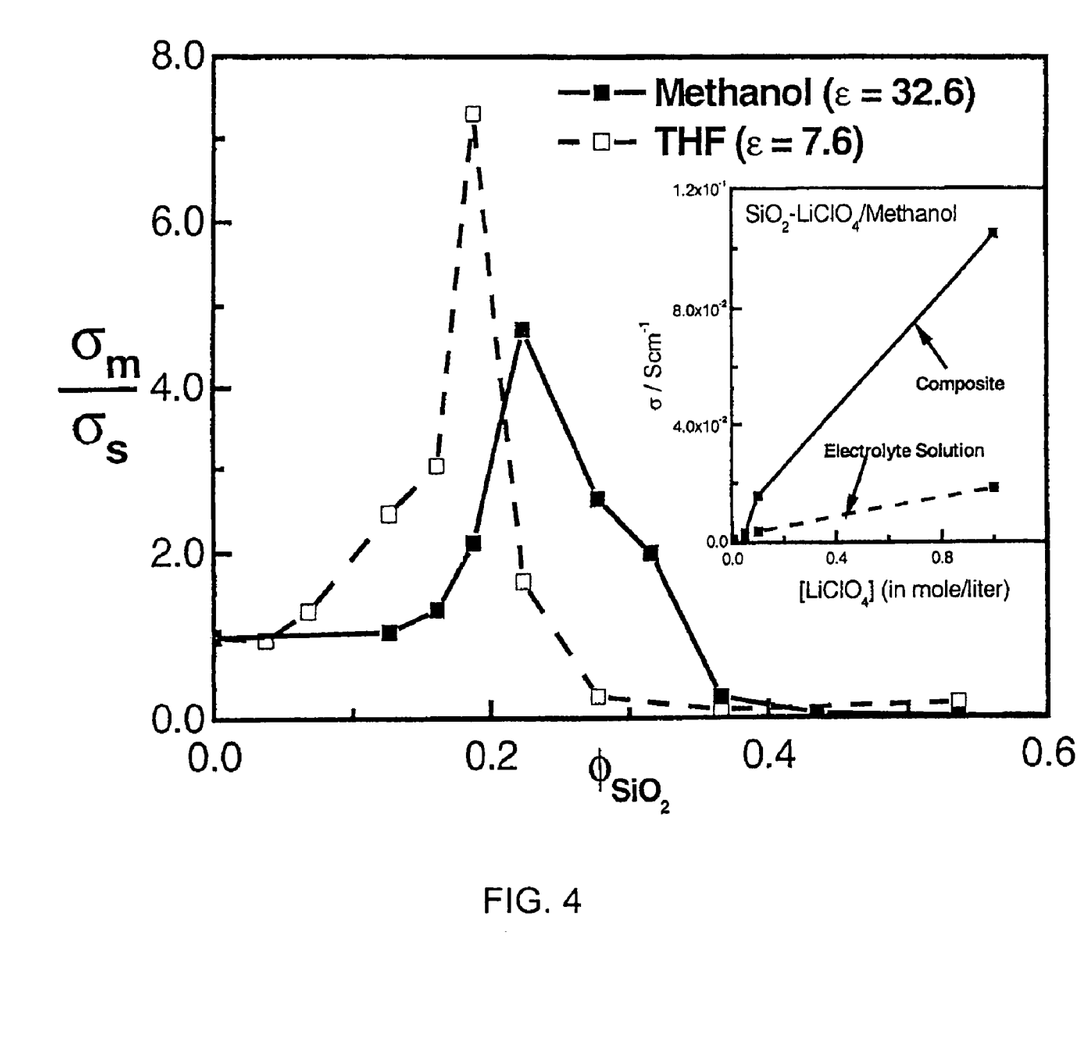
FIG. 4 shows a plot of $SiO_2/LiClO_4$—MeOH and $SiO_2/LiClO_4$—THF composite conductivity versus $SiO_2$ fraction (particle size approx. 0.3 μm) for different solvents at room temperature illustrating the ion association in a non-aqueous solution.

The role of the oxides in dissociation of ion-pairs in non-aqueous solution was further investigated by preparing composite electrolytes comprising a solution of an Li-salt in tetrahydrofuran (THF) with added $SiO_2$. The THF exhibits a significantly lower dielectric constant ($\epsilon_{THF} = 7.4$) compared to MeOH ($\epsilon_{MeOH} = 32.6$). Indeed, as shown in FIG. 4, the THF-composite shows a markedly higher enhancement in conductivity (with lower absolute $\sigma$ values) compared to the MeOH-composite for similar silica particle size and identical salt concentrations. The degree of ion-association in the case of THF (association constant of $LiClO_4$ in THF at 298 K is $4.8 \times 10^7 / l^{-1}.mol^{-1}$) is apparently higher than MeOH and the impact of the filler is accordingly higher, as is evident from FIG. 4. The fact that percolation starts earlier in the THF case is consistent with the lower $\epsilon$ (double repulsion $\propto \epsilon$) corresponding to a smaller surface charge (see equation 2). The relevance of ion-association was further corroborated by carrying out the experiment at different $Li^+$ salt concentration in MeOH, keeping the $SiO_2$ volume fraction fixed (inset of FIG. 4). As is evident, the conductivity enhancement disappears at high dilution since the association vanishes due to entropy. According to mass action, the degree of dissociation has to approach unity as salt concentration tends to zero.

Figure 5:
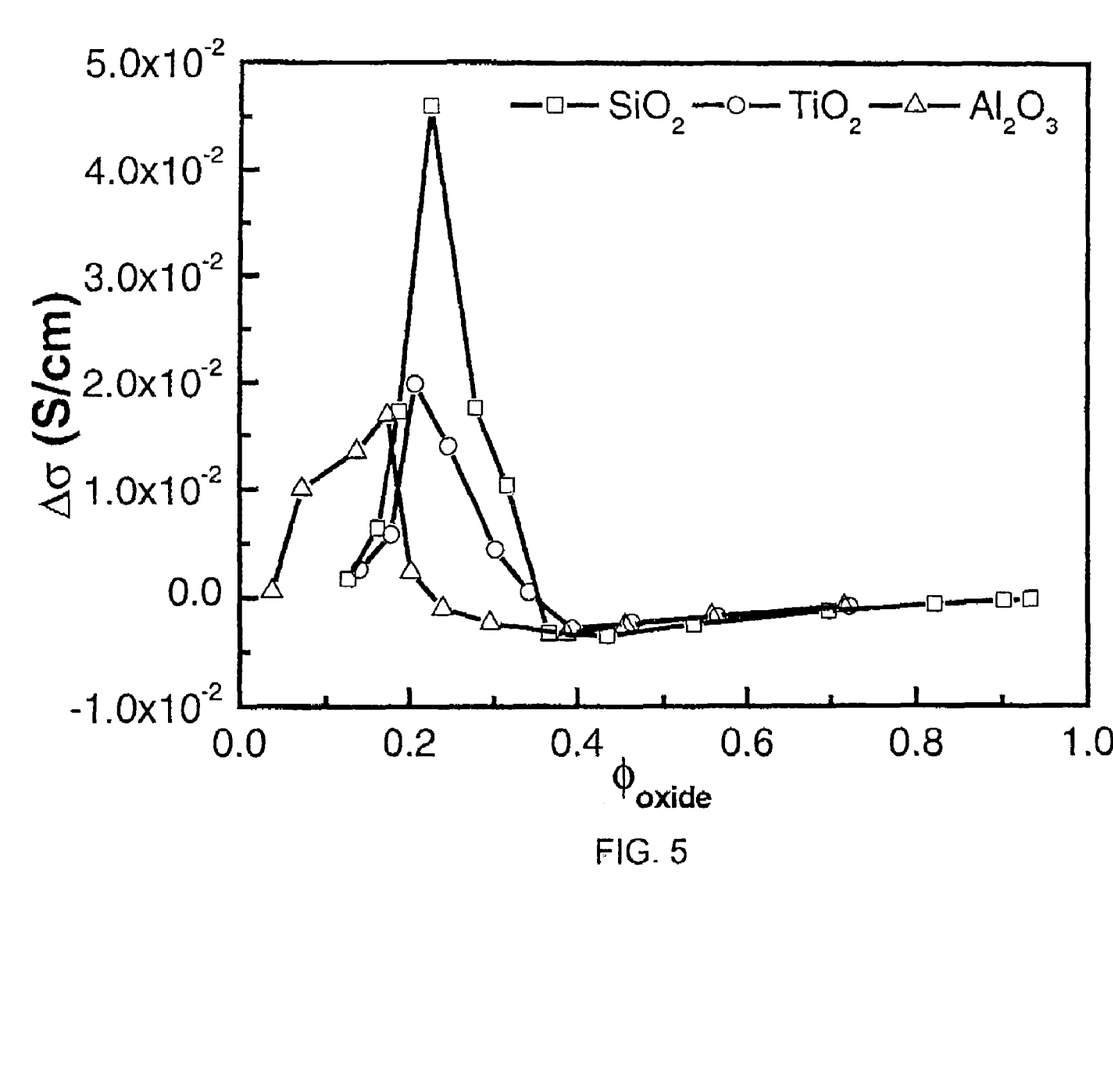
FIG. 5 shows the variation of high-conducting layer conductivity in various oxide solution composites versus oxide concentrations expressed as a volume fraction.

The effective composite conductivity ($\sigma_m$) can be written as follows:

$$\sigma_m = \beta_s \phi_s \sigma_s + \beta_l \phi_l \Delta\sigma_{m,l} \quad 1)$$

where $\phi_s$ and $\phi_l$ are the volume fractions for solution and high conducting layer respectively whereas $\sigma_s$ and $\Delta\sigma_{m,l}$ are respectively the ionic conductivities for the solution and excess conductivity of the high conducting layer. The $\beta$-factors measure the degree of percolation and are of the order of unity for a parallel switching (only percolating pathways). They are distinctly less and depend on $\phi$ if this is not the case. Equation (1) leads to the estimate of lower limit of the maximum interfacial conductivity according to $$\Delta\sigma_{m,l} > \frac{\sigma_m - \sigma_s(1-\phi)}{\phi}$$

which is plotted in FIG. 5 and pronounces even more the differences in the percolation behavior. A further evaluation of the peak conductivity in terms of the space charge effect, requires a more detailed insight into the distribution also with respect to the boundary conditions. The r.h.s. of equation 1 is proportional to $$uF(\varepsilon T c_o)^{\frac{1}{2}}$$

(where u is the mobility of the Li ions, F is the Faraday constant, E is the dielectric constant, T is the absolute temperature and $c_o$ is the concentration in the first layer adjacent to the adsorption layer) for semi-infinite boundary conditions and large effects while it tends to $uFc_o$ for a vanishing solution channel width (given a sufficient thickness to maintain mobility).

Since the dielectric constant of $CH_3OH$ is comparable to that of typical Lithium battery electrolytes a marked improvement is expected when using improved "soggy sand" electrolytes of the invention based on electrolytes which are (meta) stable in Li-batteries. The experiments conducted to date give strong evidence for the possibility of enhancing ion transport in non-aqueous solutions by breaking ion-pairs at the interfaces to appropriate second phases. Beyond that they indicate the validity of heterogeneous doping mechanism proposed for inorganic crystals to be operative also for polymer electrolytes.

The experiments conducted provide evidence for the usefulness of composite electrolytes consisting of liquid non-aqueous salt solutions and solid insulating particles. At high second phase contents the investigated system show distinctly enhanced conductivities and are better described as "soggy sand" electrolytes, a viscous grain ensemble wetted by the liquid. Unlike solid-liquid composites described by Amita Chandra and Joachim Maier in Solid State Ionics 148, pages 153 to 158 (2002), the effects are not additive rather they are synergistic in the sense that the overall conductivity is distinctly higher than both of the constituent phases, an effect that is ascribed to interfacial interaction. The "soggy sand" electrolytes of the invention as described above combine enhanced conductivities with the favourable mechanical properties of the soft matter.

Polymer electrolytes under consideration consist of a salt dissolved in a covalent polymer matrix (the cases of polymer electrolytes in which one ion is strongly bound to the polymer (e.g. Nafion) are not expected to exhibit a heterogeneous doping effect as touched upon later). They are materials of prime importance in the context of electrochemical devices. Since the compositional flexibility however is not unlimited, strategies for optimising the conductivity properties of a given conductor are necessary.

In crystalline electrolytes, i.e. influencing the conductivity by adding second phase particles proved very helpful in different cases. Indeed it has been found [Scrosati, Wieczorek] that the dispersion of oxides leads to significant conductivity increases in crystalline electrolytes. Different explanations have been proposed, most of them considering mobility changes owing to segmental motion of the polymers, variation of the degree of crystallinity etc., whereas the effect in composite inorganic electrolytes, to which the present invention is directed, has been essentially attributed to a charge carrier concentration effect.

The heterogeneous doping effect consists of internally adsorbing one ion sort and hence effectively leading to dissociation. In the crystalline state e.g. $AgCl:Al_2O_3$ this may be the adsorption of $Ag^+$ or $F^-$ ions connected with its removal from the energetically deep-lying regular positions resulting in the generation of vacancies as mobile carriers. In the covalent matrix the immobile ground state would be the undissociated ion pair with the conductivity effect consisting in the adsorption of one pair constituent resulting in breaking of the ion pair and generating a mobile counter ion as described by J. Maier, Prog. Solid St. Chem 23 pages 171 to 263 (1995). Testing this hypothesis is rather difficult since a polymer matrix may be different in various ways. It was for this reason that a decision was made to test the effect of oxide additions to a salt in a liquid solvent of low polarity, i.e. MeOH. It was found that the conductivity is significantly enhanced with a percolation behaviour typical for interfacial conductivity and that the different impact of oxides with different basicity points towards a perchlorate adsorption and hence increased $Li^+$ conductivity.

The invention claimed is:

1. A non-aqueous electrolyte consisting essentially of:
at least one ionically conducting salt;
a non-aqueous, anhydrous solvent for said ionically conductive salt, said solvent being selected to achieve a degree of dissociation of the ionically conductive salt in the non-aqueous solvent; and
at least one oxide in a particulate form with a particle size below 5 μm, said oxide being selected such that it is not soluble in said solvent and such that it is water-free, said oxide being present as a solid phase in a solution formed by said ionically conductive salt in said solvent in an amount by volume in a range from 20% to 50% whereby, percolation type behavior arises with a pronounced increase in conductivity with a marked maximum.

2. The non-aqueous electrolyte of claim 1, wherein said degree of dissociation comprises a low degree of dissociation with an association constant ranging from $1\times10^{-1}$ to $10^8/l^{-1}.mol^{-1}$.

3. The non-aqueous electrolyte of claim 1, said electrolyte being disposed in a primary or secondary lithium battery having positive and negative electrodes, said oxide being selected such that it does not react with the material of either of said positive and negative electrodes.

4. The non-aqueous electrolyte of claim 1, said electrolyte being disposed in a supercapacitor.

5. The non-aqueous electrolyte of claim 1, wherein said ionically conductive salt comprises a salt selected from the group consisting of Li(TFSI), $LiPF_6$ and $LiClO_4$, a sodium salt, and a silver salt.

6. The non-aqueous electrolyte of claim 1, wherein said non-aqueous, anhydrous solvent is selected from the group consisting of DME/EC, DEC/EC, DMC/EC, PC, Dimethyl Sulfoxide, THF, and Acryl Nitrile.

7. A non-aqueous electrolyte in accordance with claim 1, wherein said oxide is selected from the group consisting of $SiO_2$, $TiO_2$, $Al_2O_3$, and MgO.

8. The non-aqueous electrolyte of claim 1, wherein the average particle size of the oxide for particles of approximately spherical shape is selected to be less than 5 μm.

9. The non-aqueous electrolyte of claim 1, wherein the average diameter of elongated particles is selected to be less than 1 μm.

10. The non-aqueous electrolyte of claim 1, wherein the oxide is present in the electrolyte in an amount so as to give the electrolyte a consistency between that of a liquid and a solid.

11. The non-aqueous electrolyte of claim 1, wherein the oxide is present in the electrolyte in an amount by volume in the range from approximately 20 to 40%.

12. A battery comprising positive and negative electrodes and a non-aqueous electrolyte, said non-aqueous electrolyte consisting essentially of:
at least one ionically conducting salt;
a non-aqueous, anhydrous solvent associated with the ionically conductive salt, said solvent being selected to achieve a degree of dissociation of the ionically conductive salt in the non-aqueous solvent; and
at least one oxide in a particulate form with a particle size below 5 μm, said oxide being selected such that it is not soluble in said solvent and such that it is water-free, said oxide being present as a solid phase in a solution formed by said ionically conductive salt in said solvent in an amount by volume in a range from 20% to 50% whereby, percolation type behavior arises with a pronounced increase in conductivity with a marked maximum.

13. A supercapacitor comprising positive and negative electrodes and a non-aqueous electrolyte disposed between said electrodes, said non-aqueous electrolyte consisting essentially of:
at least one ionically conducting salt;
a non-aqueous, anhydrous solvent associated with the ionically conductive salt, said solvent being selected to achieve a degree of dissociation of the ionically conductive salt in the non-aqueous solvent; and
at least one oxide in a particulate form with a particle size below 5 μm, said oxide being selected such that it is not soluble in said solvent and such that it is water-free, said oxide being present as a solid phase in a solution formed by said ionically conductive salt in said solvent in an amount by volume in a range from 20% to 50% whereby, percolation type behavior arises with a pronounced increase in conductivity with a marked maximum.

14. An electro-chromic device including a non-aqueous electrolyte, said non-aqueous electrolyte comprising consisting essentially of:
at least one ionically conducting salt;
a non-aqueous, anhydrous solvent associated with the ionically conductive salt, said solvent being selected to achieve a degree of dissociation of the ionically conductive salt in the non-aqueous solvent; and
at least one oxide in a particulate form with a particle size below 5 μm, said oxide being selected such that it is not soluble in said solvent and such that it is water-free, said oxide being present as a solid phase in a solution formed by said ionically conductive salt in said solvent in an amount by volume in a range from 20% to 50% whereby, percolation type behavior arises with a pronounced increase in conductivity with a marked maximum.

15. A solar energy cell including a non-aqueous electrolyte, said non-aqueous electrolyte consisting essentially of:
at least one ionically conducting salt;
a non-aqueous, anhydrous solvent associated with the ionically conductive salt, said solvent being selected to achieve a degree of dissociation of the ionically conductive salt in the non-aqueous solvent; and
at least one oxide in a particulate form with a particle size below 5 μm, said oxide being selected such that it is not soluble in said solvent and such that it is water-free, said oxide being present as a solid phase in a solution formed by said ionically conductive salt in said solvent in an amount by volume in a range from 20% to 50% whereby, percolation type behavior arises with a pronounced increase in conductivity with a marked maximum.

16. The non-aqueous electrolyte of claim 1 wherein a heterogeneous doping effect is achieved consisting of one ion sort being absorbed and leading to said dissociation.

17. The battery of claim 12 wherein a heterogeneous doping effect is achieved consisting of one ion sort being absorbed and leading to said dissociation.

18. The supercapacitor of claim 13 wherein a heterogeneous doping effect is achieved consisting of one ion sort being absorbed and leading to said dissociation.

19. The electro-chromic device of claim 14 wherein a heterogeneous doping effect is achieved consisting of one ion sort being absorbed and leading to said dissociation.

20. The solar energy cell of claim 15 wherein a heterogeneous doping effect is achieved consisting of one ion sort being absorbed and leading to said dissociation.

21. A non-aqueous electrolyte comprising consisting essentially of:

at least one ionically conducting salt;

a non-aqueous, anhydrous solvent for said ionically conductive salt, said solvent being selected to achieve a degree of dissociation of the ionically conductive salt in the non-aqueous solvent; and at least one oxide in a particulate form with a particle size below 5 μm, said oxide being selected such that it is not soluble in said solvent and such that it is water-free, said oxide being present as a solid phase in a solution formed by said ionically conductive salt in said solvent in an amount by volume in a range from 20% to 50% to form a slurry having the consistency of soggy sand, whereby percolation type behavior arises with a pronounced increase in conductivity with a marked maximum.

* * * * *